US012258295B2

(12) United States Patent
Stefan et al.

(10) Patent No.: US 12,258,295 B2
(45) Date of Patent: Mar. 25, 2025

(54) THIOSULFATES FOR USE AS RETARDERS FOR MAGNESIUM PHOSPHATE CEMENT PASTES

(71) Applicants: ORANO DEMANTELEMENT, Chatillon (FR); UNIVERSITE GUSTAVE EIFFEL, Champs-sur-Marne (FR)

(72) Inventors: Lavinia Stefan, Saint Germain en Laye (FR); Thierry Chaussadent, Paris (FR); Hela Bessaies-Bey, Mets (FR)

(73) Assignees: ORANO DEMANTELEMENT, Chatillon (FR); UNIVERSITE GUSTAVE EIFFEL, Champs-sur-Marne (FR)

( * ) Notice: Subject to any disclaimer, the term of this patent is extended or adjusted under 35 U.S.C. 154(b) by 464 days.

(21) Appl. No.: 17/757,634

(22) PCT Filed: Dec. 8, 2020

(86) PCT No.: PCT/FR2020/052338
§ 371 (c)(1),
(2) Date: Jun. 17, 2022

(87) PCT Pub. No.: WO2021/123564
PCT Pub. Date: Jun. 24, 2021

(65) Prior Publication Data
US 2023/0024215 A1 Jan. 26, 2023

(30) Foreign Application Priority Data
Dec. 20, 2019 (FR) ...................................... 1915323

(51) Int. Cl.
*C04B 22/14* (2006.01)
*C04B 28/34* (2006.01)
*C04B 103/22* (2006.01)

(52) U.S. Cl.
CPC ............ *C04B 22/147* (2013.01); *C04B 28/34* (2013.01); *C04B 2103/22* (2013.01)

(58) Field of Classification Search
CPC ... C04B 22/147; C04B 28/34; C04B 2103/22; Y02W 30/91
See application file for complete search history.

(56) References Cited

U.S. PATENT DOCUMENTS 6,133,498 A 10/2000 Singh et al.
6,136,088 A 10/2000 Farrington

FOREIGN PATENT DOCUMENTS

| CN | 108929063 A | | 12/2018 |
|---|---|---|---|
| CN | 109020362 A | | 12/2018 |
| CN | 109422479 A | * | 3/2019 |
| CN | 110342848 A | | 10/2019 |
| FR | 2769619 A1 | | 4/1999 |
| WO | 2016102868 A2 | | 6/2016 |
| WO | 2018002540 A1 | | 1/2018 |

OTHER PUBLICATIONS

International Search Report for PCT/FR2020/052338 dated Mar. 22, 2021 and translation thereof.
Written Opinion for PCT/FR2020/052338 dated Mar. 22, 2021 and translation thereof.
Search Report for PCTFR1915323 dated Aug. 6, 2020.
Soudee, Emmanuel et al., "Influence of magnesia surface on the setting time of magnesia-phosphate cement", Cement and Cement and Concrete Research 2002, vol. 32, pp. 153-157.

* cited by examiner

*Primary Examiner* — Anthony J Green
(74) *Attorney, Agent, or Firm* — Chrisman Gallo Tochtrop LLC

(57) ABSTRACT

A use of a thiosulfate as a retarder for a cement paste comprising a magnesium phosphate cement.

16 Claims, 4 Drawing Sheets

THIOSULFATES FOR USE AS RETARDERS FOR MAGNESIUM PHOSPHATE CEMENT PASTES

CROSS-REFERENCE TO RELATED APPLICATIONS

This is a National Stage application of PCT international application PCT/FR2020/052338, filed on Dec. 8, 2020, which claims the priority of French Patent Application No. 1915323, filed Dec. 20, 2019, both of which are incorporated herein by reference in their entirety.

TECHNICAL FIELD

The invention relates to the preparation of cement materials based on magnesium phosphate pastes.

More specifically, the invention relates to the use of a thiosulfate as a retarder for a cement paste comprising a magnesium phosphate cement.

The invention is able to be applied in all the sectors of activity of civil engineering for the execution and rehabilitation of construction works (engineering structures, industrial constructions, buildings for residential or commercial use, hydraulic constructions, etc.) and infrastructures, whether for urban developments, roads, railways, or others.

PRIOR ART

Magnesium phosphate cements are inorganic cements of the acid-activated cement family. Indeed, this type of cement sets after a reaction involving an alkaline compound, namely a source of magnesium in oxidized state, and an acid compound, namely a source of phosphate, in the presence of water. The oxidized magnesium source is typically a magnesium oxide (MgO), also known as magnesia, while the phosphate source is typically a phosphoric acid salt.

Magnesium phosphate cements have very advantageous properties, particularly in respect of the evolution of the early mechanical properties thereof, the abrasion resistance thereof, the low endogenous shrinkages and drying thereof.

Nevertheless, the use thereof remains limited in civil engineering (where they are essentially used for repair works, particularly in the road sector) because it is considered as not readily compatible with larger-scale applications involving the use of large volumes.

The reasons thereof are:
on the one hand, these cements are quick-setting—this setting may even be instantaneous when the initial acid-base reaction conditions are not controlled—with, into the bargain, the formation of agglomerates which crumble readily into powder, and
on the other hand, the acid-base reaction is very highly exothermic, which makes it difficult to execute this reaction in situ.

A number of avenues have been explored to delay the setting of a magnesium phosphate cement comprising a magnesium oxide as a source of magnesium in oxidized state such as:
that of adjusting the type of phosphate source, the water-cement (W/C) ratio, or the specific surface area of magnesium oxide;
that of partially replacing magnesium oxide by alumina;
that of adding a polycarboxylate superplasticiser to the cement paste; or
that of using a retarder.

The last avenue proved to be the most conclusive and is that which is used in practice.

Currently, disodium tetra borate decahydrate ($Na_2B_4O_7 \cdot 10H_2O$), better known as borax, and boric acid are the retarders most commonly recommended for magnesium phosphate cements.

Many authors prefer borax to boric acid because, unlike the latter, borax is an alkaline compound such that the dissolution thereof in a cement paste raises the pH of this paste. This decrease in acidity helps reduce the quantity of magnesium oxide capable of dissolving, and thereby helps slow down the setting of the cement paste. Nevertheless, the setting time of a magnesium phosphate cement paste, even supplemented with borax, remains substantially less than the setting time of a Portland cement paste.

Moreover, both borax and boric acid are among the chemical substances classified as "CMR", i.e. substances which are considered by Regulation (EC) 1907/2006 on the registration, evaluation, authorisation and restriction of chemicals (or REACH Regulation) as potential or known Carcinogenic, Mutagenic and/or Reprotoxic substances. In this instance, borax and boric acid are classified as CMR for reprotoxicity. Hence, not only are borax and boric acid threatened with obsolescence, but, in addition, the use thereof on civil engineering sites involves setting up safety measures in addition to those already imposed on these sites.

This is one of the reasons for which it is proposed in international PCT application WO 2016/102868, hereinafter reference [1], to use a salt chosen from acetates, formiates, benzoates, tartrates, oleates, oxalates, bromides and iodides of alkali metals, alkaline-earth metals, zinc, aluminium or ammonium, to delay the setting of a magnesium phosphate cement paste.

The examples of reference [1] feature the results of tests aimed at comparing the retardant effect of a certain number of salts proposed with that of boric acid for magnesium phosphate pastes comprising a magnesium oxide which is referred to as either "heavily burned at high temperature" (and which can be assumed to be dead burned) or "lightly burned" (and which can be assumed to be soft burned).

These results demonstrate that, in the case of dead burned magnesium oxide pastes, a limited number of the salts tested (zinc formiate, calcium formiate and potassium acetate) have an equivalent, or superior, retardant effect to that of boric acid and that, in the case of soft burned magnesium oxide pastes, only potassium acetate has an equivalent—and only equivalent—effect to that of boric acid (12 minutes versus 11 minutes).

The results featured in reference [1] are fully in line with the data of the literature which highlight the difficulties encountered obtaining, for magnesium phosphate cement pastes, setting times compatible with large-scale use of this type of cement, especially when the magnesium oxide used in the composition of the magnesium phosphate is only lightly burned, i.e. soft burned.

Indeed, it has been demonstrated that high-temperature burning of a magnesium oxide makes it possible to reduce the reactivity by decreasing the specific surface area thereof and that the setting time of a magnesium phosphate cement is directly impacted by the specific surface area of the magnesium oxide used in the composition thereof: the greater this specific surface area, the higher the reactivity and the shorter the setting time (see, for example, E. Soudee and J. Pera, *Cement and Concrete Research* 2002, 32, 153-157, hereinafter reference [2]).

However, the purchasing price of magnesium oxides increases significantly with the degree of burning to which they have been subjected due to the costs generated by burning operations.

With a view to broadening the fields of application of magnesium phosphate cements, it would therefore be desirable to have a retarder which is not a CMR-classified chemical and which makes it possible to increase the setting time of a magnesium phosphate cement paste very effectively, not only when the source of magnesium in oxidized state used in the composition of this cement is a dead burned magnesium oxide, but also when it is a soft burned magnesium oxide so as to enable civil engineering companies to favour, for cost reasons, the use of a soft burned type magnesium oxide.

DESCRIPTION OF THE INVENTION

The aim of the invention is precisely that of proposing a new type of retarder which meets these requirements.

Indeed, the invention relates to a use of a thiosulfate as a retarder for a cement paste comprising a magnesium phosphate cement.

It should be noted that the use of a thiosulfate in the field of cementing is not novel per se. Thus, sodium thiosulfate is proposed in the U.S. Pat. No. 6,133,498, hereinafter reference [3], as a reducing agent of the metallic anions present in waste with a view to stabilising these anions in a magnesium phosphate cement paste. Similarly, a thiosulfate and, in particular, sodium thiosulfate is used in international PCT application WO 2018/002540, hereinafter reference [4], for stabilising mercury from waste by precipitating to mercury sulphide before encapsulating it by cementing.

However, what is completely novel is using a compound chosen from thiosulfates—wherein, to date, no potentially hazardous effect for health has been shown (sodium and magnesium thiosulfates even being used as active ingredients for medicinal products)—to delay the setting of a magnesium phosphate cement paste, and what is completely unexpected is that the use of thiosulfate makes it possible to very effectively delay and slow down the setting of a magnesium phosphate cement paste both in the case wherein the magnesium oxide used in the composition of this cement is soft burned and in the case where it is dead burned.

Within the scope of the present invention, the terms "cement paste" are understood in their usual meaning, i.e. they denote a paste obtained by mixing a cement—which is, within the scope of the present invention, a magnesium phosphate cement—or a composition comprising this cement, with an aqueous solution so-called mixing solution.

The term "thiosulfate" is also understood in its usual meaning, i.e. it denotes any salt of thiosulphuric acid ($H_2S_2O_3$).

Thus, the thiosulfate suitable for use according to the invention can be a salt of thiosulphuric acid and a metallic element such as a thiosulfate of an alkali metal of the type sodium thiosulfate ($Na_2S_2O_3$) or potassium thiosulfate ($K_2S_2O_3$), a thiosulfate of an alkaline earth metal of the type calcium thiosulfate ($CaS_2O_3$), magnesium thiosulfate ($MgS_2O_3$) or barium thiosulfate ($BaS_2O_3$), or a salt of thiosulphuric acid and a non-metallic element.

Of these, preference is given to sodium thiosulfate, which is advantageously used in the pentahydrate form thereof ($Na_2S_2O_3 \cdot 5H_2O$), and to potassium thiosulfate.

The terms "magnesium phosphate cement" are also understood in their usual meaning, i.e. they denote a cement composed of at least one source of magnesium in oxidized state, i.e. a compound comprising magnesium in the +II oxidation state or a precursor thereof, and at least one source of phosphate.

Any source of magnesium in oxidized state known to a person skilled in the art is suitable for use within the scope of the present invention. Thus, the source of magnesium in oxidized state can particularly be magnesium oxide, magnesium hydroxide, magnesium carbonate, calcium hydroxycarbonate, magnesium chloride, magnesium bromide or a mixture thereof.

According to the invention, the source of phosphate in oxidized state is, preferably, magnesium oxide, in which case this oxide can be:

- an unburned magnesium oxide;
- a soft burned or light burned magnesium oxide, i.e. a magnesium oxide resulting from burning a magnesium carbonate or a magnesium hydroxide at a temperature typically between 600° C. and 1000° C.;
- a hard burned magnesium oxide, i.e. a magnesium oxide resulting from burning a magnesium carbonate, a magnesium hydroxide or a soft burned magnesium oxide at a temperature typically between 1000° C. and 1500° C.; or
- a dead burned magnesium oxide, i.e. a magnesium oxide resulting from burning a magnesium carbonate, a magnesium hydroxide or a soft burned magnesium oxide at a temperature typically greater than 1500° C. and up to 2300° C.

In this regard, it is specified that there is a test that is simple and quick to use for readily determining the category to which a magnesium oxide belongs. This is a citric acid reactivity test which is used industrially. This test consists of stirring 2.0 g of magnesium oxide powder in 100 mL of a 0.4 N citric acid solution to which 5 drops of phenolphthalein are added. The neutralisation time, which corresponds to the change of colour of the phenolphthalein, is considered as the citric acid reactivity time.

Table I hereinafter shows, for each MgO category, the citric acid reactivity time and the BET specific surface area (i.e. as determined with the Brunauer, Emmett and Teller method) as a function of the burning temperature and the burning time.

TABLE I

| MgO category | MgO burning temperature (° C.) | MgO burning time (hours) | BET specific surface area ($m^2/g$) | Citric acid reactivity time (s) |
|---|---|---|---|---|
| Unburned | — | — | 68.4 | 39 |
| Soft burned | 1000 | 3 | 42.4 | — |
| | 1000 | 24 | 26.84 | 70 |
| Hard burned | 1200 | 3 | 10.06 | 245 |
| | 1200 | 24 | 7.32 | 565 |
| Dead burned | 1500 | 3 | 0.99 | >900 |
| | 1500 | 24 | 0.45 | >900 |

Moreover, the magnesium oxide can be a pure magnesium oxide (i.e. having a purity, expressed by mass, greater than 95% and, preferably, greater than 99%) or, on the other hand, comprise at least one other element at a rate of at least 5% by mass such as silicon, calcium, iron or aluminium, this (these) element(s) generally being in oxide and/or hydroxide form.

The source of magnesium in oxidized state used within the scope of the present invention is typically in powdery form.

Any source of phosphate known to a person skilled in the art is also suitable for use within the scope of the present invention. Thus, the source of phosphate can particularly be:
- an acid such as phosphoric acid, orthophosphoric acid, pyrophosphoric acid or polyphosphoric acid;
- a salt of phosphoric acid and a metallic element such as a phosphate of an alkali metal of the type sodium or potassium phosphate, a phosphate of an alkaline-earth metal of the type calcium or magnesium phosphate, aluminium phosphate, a monohydrogen phosphate of an alkali metal of the type sodium or potassium monohydrogen phosphate, a monohydrogen phosphate of an alkaline-earth metal of the type calcium or magnesium monohydrogen phosphate, aluminium monohydrogen phosphate, a dihydrogen phosphate of an alkali metal of the type sodium or potassium dihydrogen phosphate, a dihydrogen phosphate of an alkaline-earth metal of the type calcium or magnesium dihydrogen phosphate, aluminium dihydrogen phosphate, an orthophosphate of an alkali metal of the type sodium or potassium orthophosphate, an orthophosphate of an alkaline-earth metal of the type calcium or magnesium orthophosphate, aluminium orthophosphate, a pyrophosphate of an alkaline metal of the type sodium or potassium pyrophosphate, a pyrophosphate of an alkaline-earth metal of the type calcium or magnesium pyrosphosphate, aluminium pyrophosphate, a tri-, tetra- or pentapolyphosphate of an alkali metal of the type sodium or potassium tri-, tetra- or pentapolyphosphate, a tri-, tetra- or pentapolyphosphate of an alkaline-earth metal of the type calcium or magnesium tri-, tetra- or pentapolyphosphate, or an aluminium tri-, tetra- or pentapolyphosphate;
- a salt of phosphoric acid and a non-metallic element such as ammonia phosphate, ammonia monohydrogen phosphate, ammonia dihydrogen phosphate, ammonia orthophosphate, ammonia pyrophosphate, or an ammonia tri-, tetra- or pentapolyphosphate; or
- a mixture thereof.

Advantageously, the phosphate source is chosen from sodium phosphate ($Na_3PO_4$), sodium monohydrogen phosphate ($Na_2HPO_4$), sodium dihydrogen phosphate ($NaH_2PO_4$), potassium phosphate ($K_3PO_4$), potassium monohydrogen phosphate ($K_2HPO_4$), potassium dihydrogen phosphate ($KH_2PO_4$), aluminium phosphate ($AlPO_4$), aluminium monohydrogen phosphate ($Al_2(HPO_4)_3$), ammonium phosphate (($NH_4)_3PO_4$), ammonium monohydrogen phosphate (($NH_4)_2HPO_4$), ammonium dihydrogen phosphate ($NH_4H_2PO_4$), and mixtures thereof.

Of these, preference is given to potassium dihydrogen phosphate.

The phosphate source can be in a liquid form (which will be the case of an acid) or in a solid, typically powdery, form (which will generally be the case of a salt). In the first case, it is advantageously present in the mixing solution whereas, in the second case, it is advantageously mixed with the source of magnesium in oxidized state prior to mixing.

In any case, the source of magnesium in oxidized state and the source of phosphate making up the magnesium phosphate cement are used in quantities such that the molar ratio Mg/P (i.e. between the elements magnesium and phosphorus) of this cement ranges preferably from 1 to 12 and, more preferably, from 1 to 10.

Moreover, thiosulfate is used in quantities such that the mass ratio of thiosulfate/magnesium phosphate cement (i.e. source of magnesium in oxidized state+source of phosphate) ranges, preferably, from 0.01 to 0.25 and, more preferably, from 0.03 to 0.20.

Advantageously, it is present in the mixing solution.

According to the invention, the cement paste can further comprise at least one adjuvant such as a plasticiser (water-reducing agent or not), a superplasticiser, an additional retarder which is not a thiosulfate or a compound which combines several effects such as a superplasticiser/retarder, depending on the workability, setting and/or hardening properties sought to be given to the cement paste.

In particular, the composition can comprise a superplasticiser and/or an additional retarder which is not a thiosulfate and of which the retardant effect will supplement that of the thiosulfate.

Superplasticisers that can be suitable are particularly high water-reducing superplasticisers such as polynaphthalene sulphonates.

Additional retarders that can be suitable are particularly hydrofluoric acid (HF) and the salts thereof (sodium fluoride for example), boric acid ($H_3BO_3$) and the salts thereof including borax, citric acid and the salts thereof (sodium citrate for example), malic acid and the salts thereof (sodium malate for example), tartaric acid and the salts thereof (sodium tartrate for example), sodium carbonate ($Na_2CO_3$) and sodium gluconate.

Of these, preference is given to hydrofluoric acid, sodium fluoride, citric acid, sodium citrate, boric acid and borax.

When the cement paste comprises a superplasticiser, the latter is, preferably, used in a mass ratio of superplasticiser/magnesium phosphate cement (i.e. source of magnesium in oxidized state+source of phosphate) of at most 0.05 whereas, when the cement paste comprises an additional retarder, the latter is, preferably, used in a mass ratio of additional retarder/magnesium phosphate cement (i.e. source of magnesium in oxidized state+source of phosphate) of at most 0.1.

According to the invention, the cement paste can further comprise at least one aggregate, which can particularly be:
- a filler, for example a silica filler such as a quartz powder of the type marketed by Sibelco under the reference C800, in which case the mass ratio of filler/magnesium phosphate ratio (i.e. source of magnesium in oxidized state+source of phosphate) can be up to 0.3;
- a sand, for example of the type marketed by SIBELCO under the reference CV32 or of the type marketed by Sablières Palvadeau, in which case the cement paste is called mortar and the mass ratio of sand/magnesium phosphate cement (i.e. source of magnesium in oxidized state+source of phosphate) can be up to 6; or
- a fine gravel, in which case the cement paste is called concrete and the mass ratio of fine gravel/magnesium phosphate cement (i.e. source of magnesium in oxidized state+source of phosphate) can be up to 4.

The terms "filler", "sand" and "fine gravel" must be understood in their usual meaning in the field of mortars and concretes (see in particular the standard NF EN 12620 on aggregates for concrete), i.e.:
- a filler is an aggregate wherein the upper dimension D is less than 2 mm with at least 85% passing at 1.25 mm and 70% passing at 0.063 mm;
- a sand is an aggregate wherein the lower dimension d is at least equal to 0 mm and wherein the upper dimension D is at most equal to 4 mm; whereas
- a fine gravel is an aggregate wherein the lower dimension d is at least equal to 2 mm and wherein the upper dimension D is at least equal to 4 mm, it being understood that, within the scope of the present invention, the upper dimension D of the fine gravel is, preferably, at most equal to 16 mm.

According to the invention, the cement paste typically comprises a mass ratio of water/magnesium phosphate cement ranging from 0.10 to 1, preferably, from 0.20 to 0.60 and, more preferably, from 0.30 to 0.55.

Further features and advantages of the invention will emerge from the following supplementary description, which is given with reference to the appended figures.

Obviously, this supplementary description is merely given by way of illustration of the subject matter of the invention, and must in no way be interpreted as a restriction of this subject matter.

DETAILED DESCRIPTION OF SPECIFIC IMPLEMENTATIONS

Figure 1:
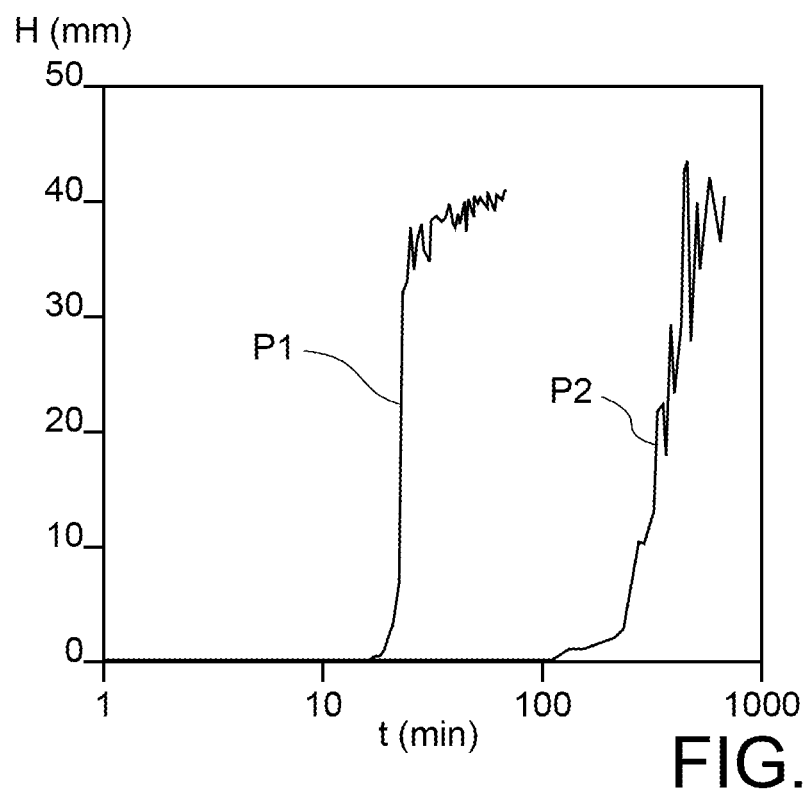
FIG. 1 illustrates the setting height, denoted H and expressed in mm, as a function of time, denoted t and expressed in minutes, as obtained for two pastes, respectively P1 and P2, of dead burned MgO magnesium phosphate cement and only differing from one another in that the paste P1 only comprises borax as a retarder whereas the paste P2 comprises both sodium thiosulfate and borax as retarders.

In the following examples, all the cement pastes are magnesium phosphate cement pastes and were prepared using:

as magnesium oxide: either a dead burned magnesium oxide—hereinafter denoted DB MgO—from Richard Baker Harrison Ltd (DBM90 200 mesh), of specific surface area equal to 0.75 m$^2$/g, or a high-purity (>98%) magnesium oxide from ChemLab, of specific surface area equal to 64 m$^2$/g and which is comparable to a soft burned magnesium oxide—hereinafter denoted SB MgO—according to Table I hereinabove;

as phosphoric acid salt: potassium dihydrogen phosphate $KH_2PO_4$ from ChemLab; and as retarder(s): sodium thiosulfate pentahydrate $Na_2S_2O_3 \cdot 5H_2O$ from ChemLab, potassium thiosulfate $K_2S_2O_3$ from Sigma-Aldrich and/or borax $Na_2B_4O_7 \cdot 10H_2O$ from ChemLab.

Some of these pastes comprise aggregates, in which case they comprise a quartz powder (C800 from Sibelco) and sand of grain size 0.315/1 mm (Sabliéres Palvadeau).

Moreover, all these cement pastes were prepared by following the same mixing sequence wherein:

the solid constituents (MgO, $KH_2PO_4$ and, where applicable, borax and/or quartz and sand) were introduced into a mixing bowl and mixed together for 2 minutes to obtain a homogeneous mixture, then the mixing water containing a thiosulfate (in the case of a paste according to the invention) or not (in the case of a paste serving as a reference) was added to the mixture and the whole was mixed for 2 minutes.

The cement pastes were hardened at a temperature of 20° C.±2° C. and a relative humidity greater than 50%.

The setting times of the cement pastes were measured with Vicat needle tests as per the European standard NF EN 196-3: 2017 (Methods of testing cement. Part 3: Determination of setting times and soundness).

The temperatures of the cement pastes were measured by means of a Langavant semi-adiabatic calorimeter as per the standard NF EN 196-9: 2010 (Methods of testing cement. Part 9: Heat of hydration—Semi-adiabatic method).

The compressive strengths of the materials obtained from hardening the cement pastes were measured by means of a press on half-specimens (4 cm×4 cm×16 cm) of these materials as per the standard NF EN 196-1: 2016 (Methods of testing cement. Part 1: Determination of strength).

The yield points of the cement pastes were determined with flow table tests; these tests consist of slowly pouring, onto a wet glass slab, samples of the cement pastes contained in a beaker, after having left these pastes to rest in the mixer and then mixing them for 15 seconds just before performing the flow table tests; the flow radius of the samples is measured and the yield point, denoted $\tau_0$ and expressed in N/m$^2$ or, more preferably, in Pa, is calculated by means of the Roussel and Coussot equation whereby:

$$\tau_0 = \frac{225\rho g V^2}{128\pi^2 R^5}$$

$\rho$ is the density of the cement paste in kg/m$^3$ g is the gravitational acceleration in N/kg V is the volume of the cement paste sample poured onto the slab in m$^3$ R is the flow radius of the cement paste sample on the slab in m.

Example 1: Demonstration of the Beneficial Effects Associated with the Presence of Sodium Thiosulfate in a DB MgO Magnesium Phosphate Cement Paste Comprising Borax Two pastes, respectively P1 and P2, of DB MgO magnesium phosphate cement are prepared, which only differ from one another in that the paste P1 (serving as a reference) only comprises borax as a retarder whereas the paste P2 comprises both sodium thiosulfate and borax as retarders.

The qualitative and quantitative composition of these pastes is shown in Table II hereinafter.

TABLE II

| Pastes | DB MgO (g) | $KH_2PO_4$ (g) | Borax (g) | Quartz (g) | Sand (g) | Na Thiosulfate (g) | Water (g) |
|---|---|---|---|---|---|---|---|
| P1 | 500 | 340 | 25[a] | 217 | 1489 | — | 252 |
| P2 | 500 | 340 | 25[a] | 217 | 1489 | 44[b] | 252 |

[a] representing a mass ratio of borax/(MgO + $KH_2PO_4$) of about 0.03
[b] representing a mass ratio of thiosulfate/(MgO + $KH_2PO_4$) of about 0.05

The pastes P1 and P2 are subjected to tests aimed at measuring their setting time as well as their temperature during setting, whereas the materials obtained by hardening these pastes are subjected to tests aimed at measuring the compressive strength thereof.

Figure 2:
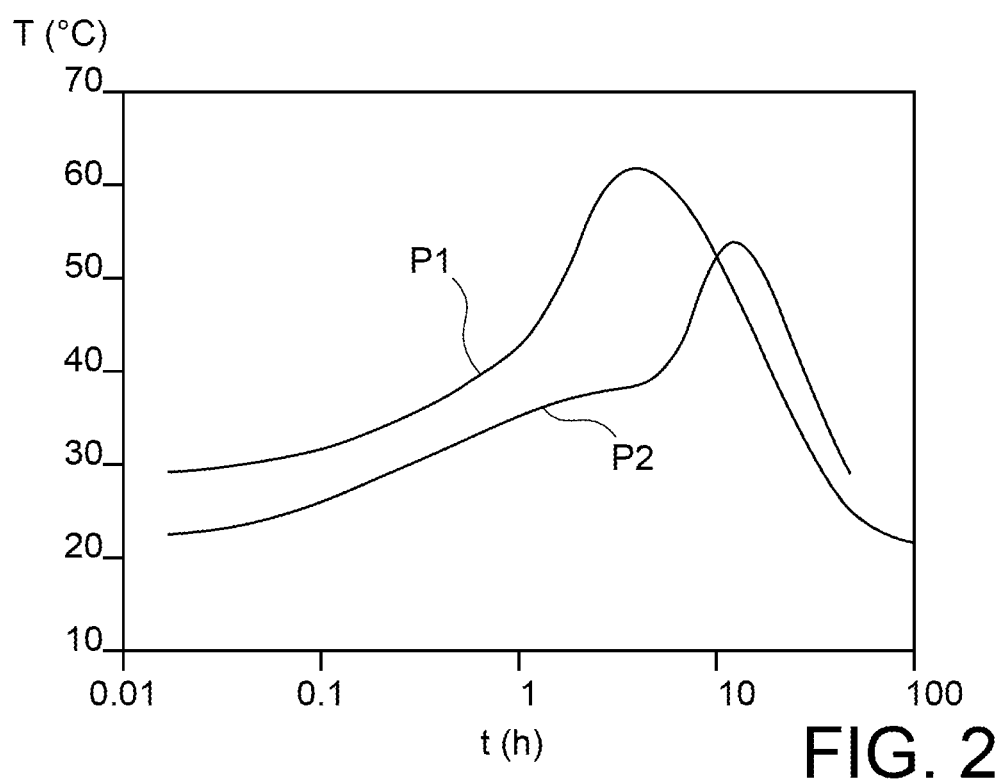
FIG. 2 illustrates the trend in the temperature, denoted T and expressed in ° C., as a function of time, denoted t and expressed in hours, as observed for the cement pastes P1 and P2.
Figure 3:
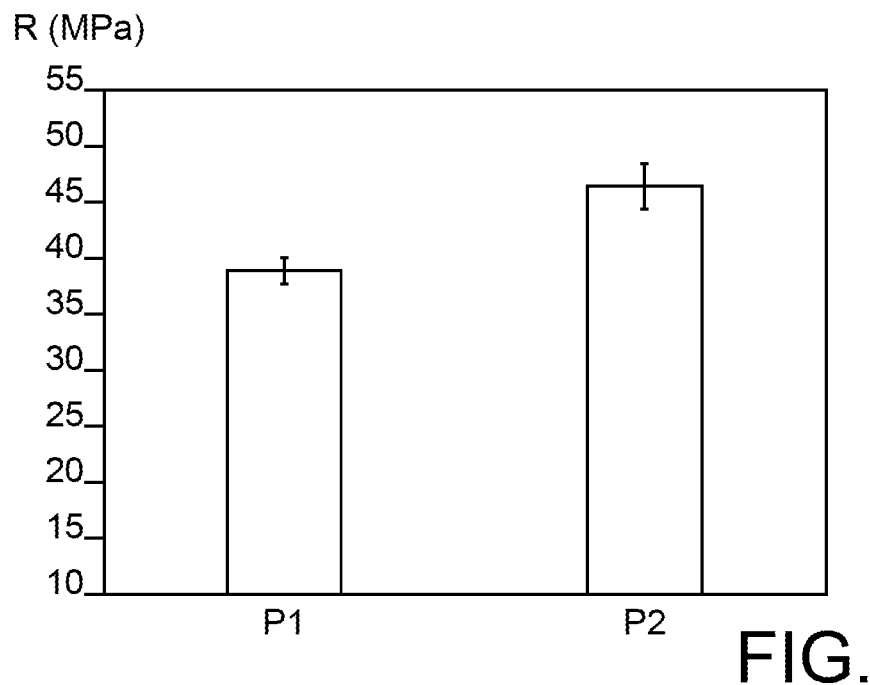
FIG. 3 illustrates the compressive strength at 28 days, denoted R and expressed in MPa, as obtained for two materials resulting from the hardening of the cement pastes P1 and P2 respectively.

The results of the setting time measurements are shown in Table III hereinafter and in FIG. 1 whereas the results of the temperature measurements during setting and of the compressive strength measurements are illustrated in FIGS. 2 and 3.

TABLE III

| Pastes | Setting start time (min) | Setting end time (min) |
|---|---|---|
| P1 | 21 | 24 |
| P2 | 234 (i.e. 3 hours and 54 min) | 513 (i.e. 8 hours and 33 min) |

Table III and FIG. 1 show that the presence of sodium thiosulfate in a DB MgO magnesium phosphate cement paste comprising borax makes it possible to dramatically delay and slow down the setting of this paste compared to that of a cement paste of the same composition but free from sodium thiosulfate since the presence of sodium thiosulfate makes it possible to multiply the setting start time by a factor of 11 and the setting end time by a factor of 21.

FIG. 2 shows that the presence of sodium thiosulfate in a DB MgO magnesium phosphate cement paste comprising borax also makes it possible to significantly reduce the temperature rise of this paste during setting and, therefore, the heat of hydration thereof compared to that of a cement paste of identical composition but free from sodium thiosulfate.

As regards FIG. 3, it shows that the presence of sodium thiosulfate in a DB MgO magnesium phosphate cement paste comprising borax does not negatively impact the compressive strength of the material resulting from hardening this paste.

It should be noted that the setting times obtained for the paste P2 are similar to those obtained for Portland cement pastes.

Example 2: Demonstration of the Beneficial Effects Associated with the Presence of Sodium or Potassium Thiosulfate in DB MgO Magnesium Phosphate Cement Pastes Free from Borax Five DB MgO magnesium phosphate cement pastes, respectively P3, P4, P5, P6 and P11, are prepared.

The paste P3 (serving as a reference) only comprises borax as a retarder.

The pastes P4, P5 and P6 only comprise sodium thiosulfate, at different mass concentrations, as a retarder.

The paste P11 only comprises potassium thiosulfate as a retarder.

Furthermore, the paste P6 differs from the four others in that it does not comprise quartz or sand.

The qualitative and quantitative composition of these pastes is shown in Table IV hereinafter.

TABLE IV

| Pastes | DB MgO (g) | $KH_2PO_4$ (g) | Borax (g) | Quartz (g) | Sand (g) | $Na_2S_2O_3$ (g) | $K_2S_2O_3$ (g) | Water (g) |
|---|---|---|---|---|---|---|---|---|
| P3 | 500 | 340 | 25[a] | 217 | 1489 | — | — | 252 |
| P4 | 500 | 340 | — | 217 | 1489 | 66[b] | — | 252 |
| P5 | 500 | 340 | — | 217 | 1489 | 88[c] | — | 252 |
| P6 | 500 | 340 | — | — | — | 100[d] | — | 252 |
| P11 | 500 | 340 | — | 217 | 1489 | — | 76.71[e] | 288.3 |

[a] representing a mass ratio of borax/(MgO + $KH_2PO_4$) of about 0.03
[b] representing a mass ratio of thiosulfate/(MgO + $KH_2PO_4$) of about 0.08
[c] representing a mass ratio of thiosulfate/(MgO + $KH_2PO_4$) of about 0.1
[d] representing a mass ratio of thiosulfate/(MgO + $KH_2PO_4$) of about 0.12
[e] representing a mass ratio of thiosulfate/(MgO + $KH_2PO_4$) of about 0.09

The pastes P3 to P6 and P11 are subjected to tests aimed at measuring the setting time thereof whereas the pastes P3 and P4 are furthermore subjected to tests aimed at measuring the yield point thereof.

Figure 5:
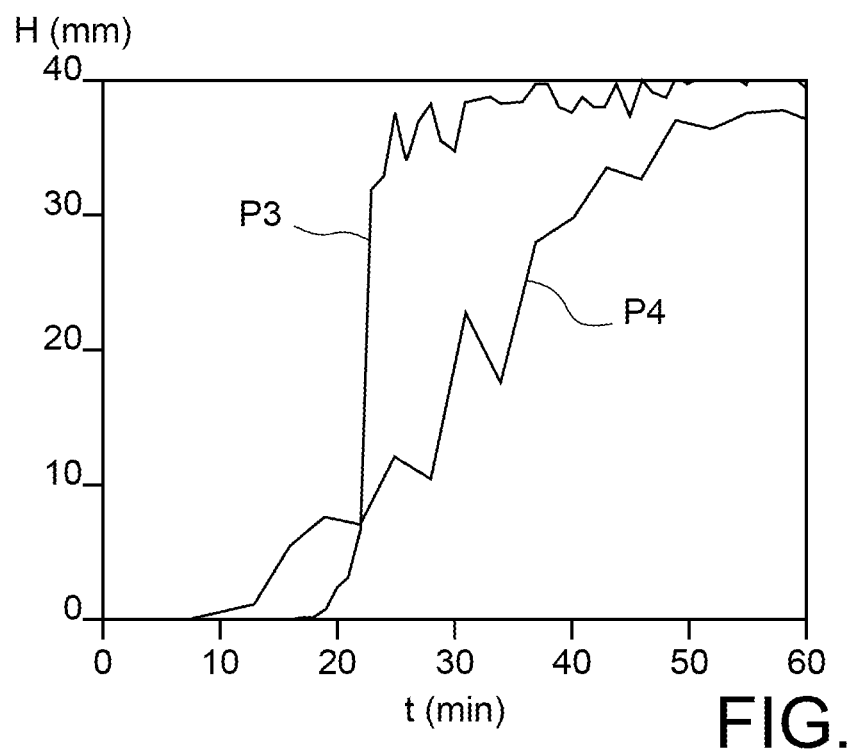
FIG. 5 is a reworking of the data shown in FIG. 4 for the cement pastes P3 and P4 making it possible to better visualise the setting height of these pastes over the first 60 minutes of the x-axis in FIG. 4.
Figure 6:
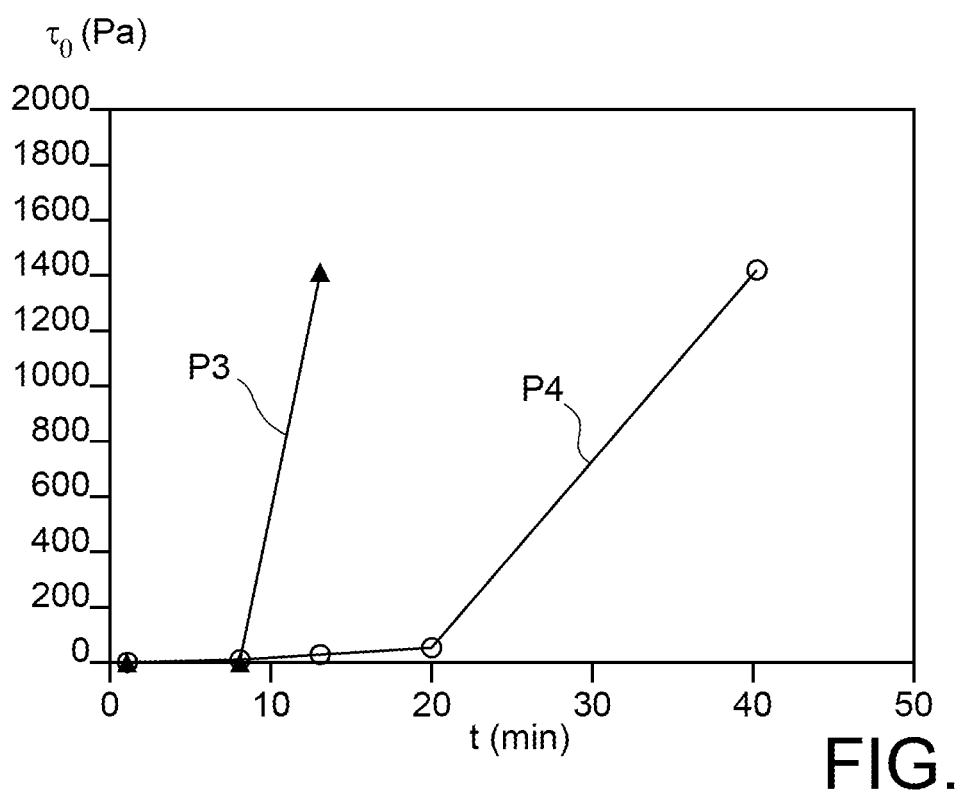
FIG. 6 illustrates the yield point, denoted $\tau_0$ and expressed in Pa, as a function of time, denoted t and expressed in minutes, as obtained for the cement pastes P3 and P4.

The results of the setting time measurements are shown in Table V hereinafter and in FIGS. 4 and 5 whereas the results of the yield point measurements are illustrated in FIG. 6.

TABLE V

| Pastes | Setting end time (min) |
|---|---|
| P3 | 24 |
| P4 | 47 |
| P5 | 116 (i.e. 1 hour and 56 min) |
| P6 | 127 (i.e. 2 hours and 7 min) |
| P11 | 236 (i.e. 3 hours and 56 min) |

Figure 4:
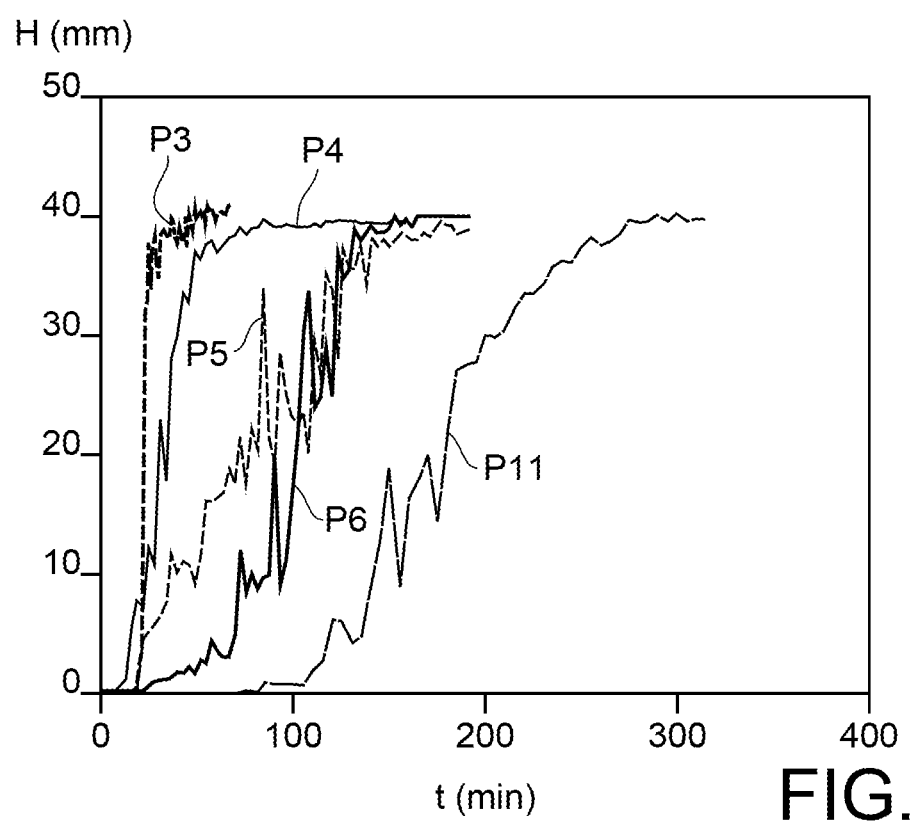
FIG. 4 illustrates the setting height, denoted H and expressed in mm, as a function of time, denoted t and expressed in minutes, as obtained for five pastes, respectively P3, P4, P5, P6 and P11, of dead burned MgO magnesium phosphate cement, differing from one another by the retarder comprised therein (borax for the paste P3; sodium thiosulfate, at different mass concentrations, for the pastes P4, P5 and P6; potassium thiosulfate for the paste P11) and also in that the pastes P3, P4, P5 and P11 are mortars whereas the paste P6 is free from aggregates.

This table and FIG. 4 show that the presence of sodium thiosulfate in a DB MgO magnesium phosphate cement paste makes it possible, in the absence of borax, to delay the end of setting of this paste, in an especially pronounced way as the mass concentration of sodium thiosulfate of the paste increases.

They furthermore demonstrate that the presence of potassium thiosulfate in a DB MgO magnesium phosphate cement makes it possible to dramatically delay and slow down the setting of this paste.

A specificity of the presence of sodium thiosulfate in a cement paste is that of increasing the thixotropic nature of this paste. Left to rest, the cement paste starts structuring within the first 10 to 20 minutes. Even though, at this time, the initial setting has not yet been achieved, the solid structure of the cement paste starts to form. This phenomenon can be observed during the first setting height measurements which are different from 0 in the Vicat needle tests. FIG. 5 shows that it takes place for the paste P4 comprising sodium thiosulfate before taking place for the paste P3 comprising borax.

However, under stress such as that induced by mixing, the cement paste can be destructured, which makes it possible to lower the viscosity thereof.

Thus, FIG. 6 which illustrates the results of the yield point measurements of the pastes P3 and P4 as obtained after having left these pastes to rest in the mixer and then mixing them for 15 seconds demonstrates that, on one hand, the yield point of the paste P4 remains low for longer than the yield point of the paste P3 and, on the other, the increase in the point has slower kinetics than the increase in the yield point of the paste P3. This means that a cement paste comprising sodium thiosulfate remains fluid for longer than a cement paste comprising borax, which is liable to facilitate the use thereof on an industrial scale.

Example 3: Demonstration of the Beneficial Effects Associated with the Presence of Sodium Thiosulfate in SB MgO Magnesium Phosphate Cement Pastes Free from Borax Four pastes, respectively P7, P8, P9 and P10, of SB MgO magnesium phosphate cement are prepared, differing from one another in that the pastes P7 and P8 (serving as references) only comprise borax, at different mass concentrations, as a retarder whereas the pastes P9 and P10 only comprise sodium thiosulfate, at different mass concentrations, as a retarder.

All these pastes are free from quartz and sand.

The qualitative and quantitative composition thereof is shown in Table VI hereinafter.

TABLE VI

| Pastes | SB MgO (g) | $KH_2PO_4$ (g) | Borax (g) | Na Thiosulfate (g) | Water (g) |
|---|---|---|---|---|---|
| P7 | 100 | 338 | 32[a] | — | 100 |
| P8 | 100 | 338 | 80[b] | — | 100 |
| P9 | 100 | 338 | — | 65[c] | 100 |
| P10 | 100 | 338 | — | 80[d] | 100 |

[a]representing a mass ratio of borax/(MgO + $KH_2PO_4$) of about 0.07
[b]representing a mass ratio of borax/(MgO + $KH_2PO_4$) of about 0.18
[c]representing a mass ratio of thiosulfate/(MgO + $KH_2PO_4$) of about 0.15
[d]representing a mass ratio of thiosulfate/(MgO + $KH_2PO_4$) of about 0.18

The pastes P7 to P10 are subjected to tests aimed at measuring the setting time thereof.

Figure 7:
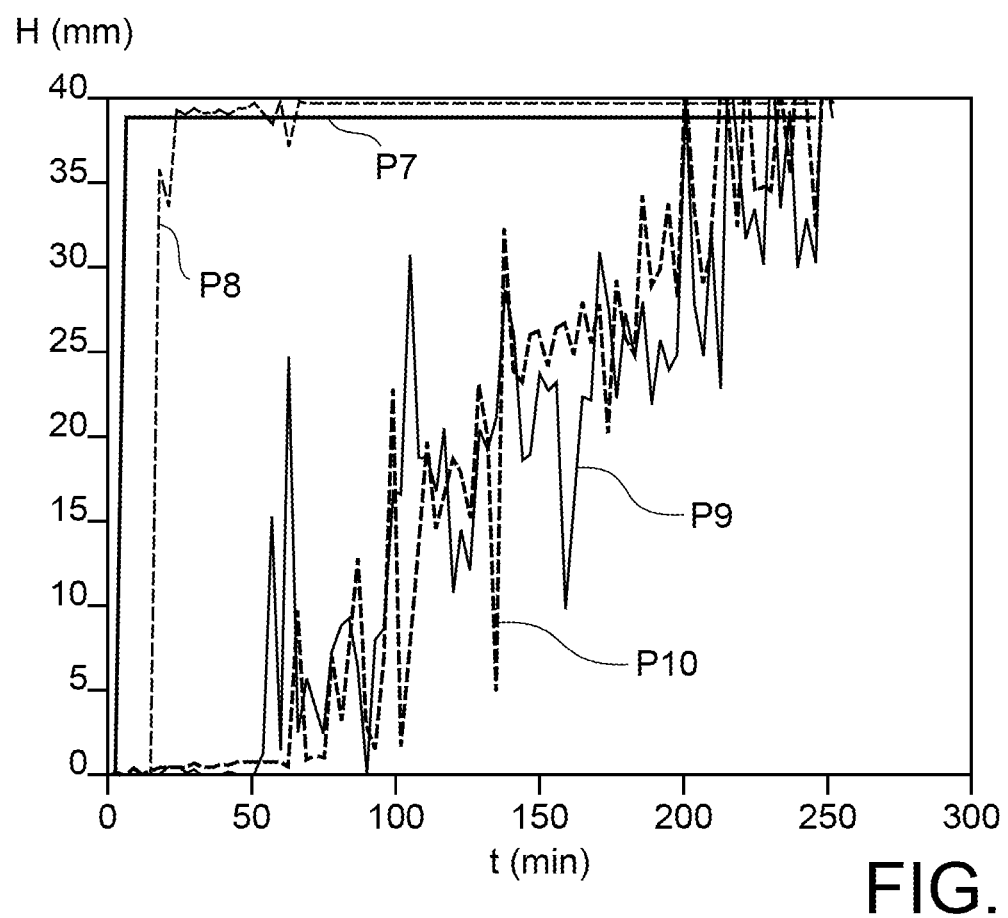
FIG. 7 illustrates the setting height, denoted H and expressed in mm, as a function of time, denoted t and expressed in minutes, as obtained for four pastes, respectively P7, P8, P9 and P10, of magnesium phosphate cement comprising an MgO comparable to a soft burned MgO, these pastes differing from one another in that the pastes P7 and P8 only comprise borax as a retarder, whereas the pastes P9 and P10 only comprise sodium thiosulfate, at different mass concentrations, as a retarder.

The results of these tests are shown in Table VII hereinafter and illustrated in FIG. 7.

TABLE VII

| Pastes | Setting start time (min) | Setting end time (min) |
|---|---|---|
| P7 | 6 | 6 |
| P8 | 18 | 18 |
| P9 | 63 | 198 (i.e. 3 hours and 18 min) |
| P10 | 60 | 198 (i.e. 3 hours and 18 min) |

This table and this figure show that, in the case of a SB MgO magnesium phosphate cement paste, borax appears to be ineffective in delaying the setting of this paste.

However, sodium thiosulfate makes it possible to very effectively delay and slow down the setting of such a cement paste since an initial setting is obtained, for the pastes P9 and P10, at around one hour whereas a final setting is obtained, for the same pastes, at around 3 hours and 20 min.

Such setting times are compatible with large-scale use of the magnesium phosphate cements and make it possible to avoid the use of a dead burned magnesium oxide.

REFERENCES CITED

[1] WO-A-2016/102868
[2] E. Soudee and J. Pera, *Cement and Concrete Research* 2002, 32, 153-157
[3] U.S. Pat. No. 6,133,498
[4] WO-A-2018/002540

The invention claimed is:

1. A method for delaying a setting of a cement paste comprising a magnesium phosphate cement, comprising including a retarder in the cement paste, wherein the retarder is a thiosulfate.

2. The method of claim 1, wherein the thiosulfate is sodium thiosulfate, potassium thiosulfate, calcium thiosulfate or magnesium thiosulfate.

3. The method of claim 1, wherein the magnesium phosphate cement comprises a source of magnesium in oxidized state, the source of magnesium in oxidized state being magnesium oxide, magnesium hydroxide, magnesium carbonate, calcium hydroxycarbonate, magnesium chloride, magnesium bromide, or a mixture thereof.

4. The method of claim 1, wherein the magnesium phosphate cement comprises a source of phosphate, the source of phosphate being sodium phosphate, sodium monohydrogen phosphate, sodium dihydrogen phosphate, potassium phosphate, potassium monohydrogen phosphate, potassium dihydrogen phosphate, aluminium phosphate, aluminium monohydrogen phosphate, ammonium phosphate, ammonium monohydrogen phosphate, ammonium dihydrogen phosphate, or a mixture thereof.

5. The method of claim 1, wherein the magnesium phosphate cement has a molar ratio magnesium/phosphorus ranging from 1 to 12.

6. The method of claim 1, wherein the cement paste has a mass ratio thiosulfate/magnesium phosphate cement ranging from 0.01 to 0.25.

7. The method of claim 1, wherein the cement paste further comprises at least one adjuvant, the adjuvant being a plasticiser, a superplasticiser and a retarder other than a thiosulfate.

8. The method of claim 7, wherein the retarder other than a thiosulfate is hydrofluoric acid, sodium fluoride, citric acid, sodium citrate, boric acid or borax.

9. The method of claim 1, wherein the cement paste further comprises at least one aggregate, the aggregate being a filler, a sand or a fine gravel.

10. The method of claim 1, wherein the cement paste has a mass ratio water/magnesium phosphate cement ranging from 0.10 to 1.

11. The method of claim 2, wherein the thiosulfate is sodium thiosulfate or potassium thiosulfate.

12. The method of claim 3, wherein the source of magnesium in oxidized state is magnesium oxide.

13. The method of claim 4, wherein the source of phosphate is potassium dihydrogen phosphate.

14. The method of claim 6, wherein the mass ratio thiosulfate/magnesium phosphate cement ranges from 0.03 to 0.20.

15. The method of claim 10, wherein the mass ratio water/magnesium phosphate cement ranges from 0.20 to 0.60.

16. The method of claim 1, wherein including the thiosulfate in the cement paste comprises mixing the magnesium phosphate cement with a mixing solution comprising the thiosulfate.

* * * * *